Feb. 9, 1926.
F. ANDREWS
1,572,830
DEVICE FOR PLACING BELTS ON PULLEYS
Filed August 29, 1925
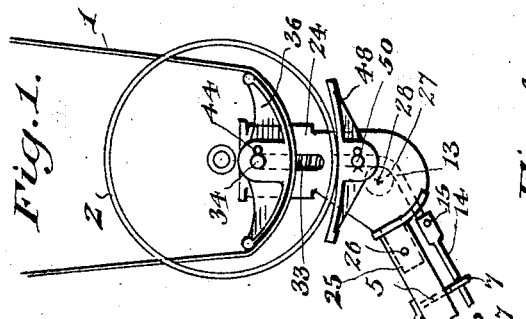
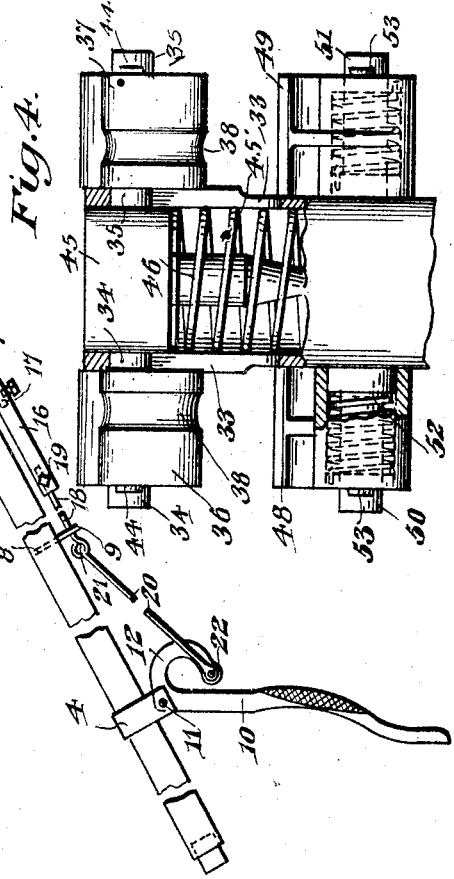
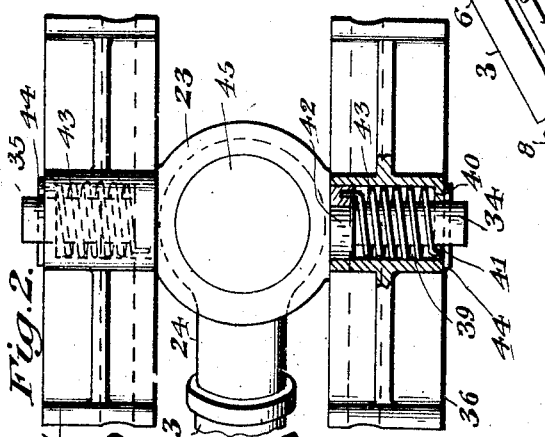
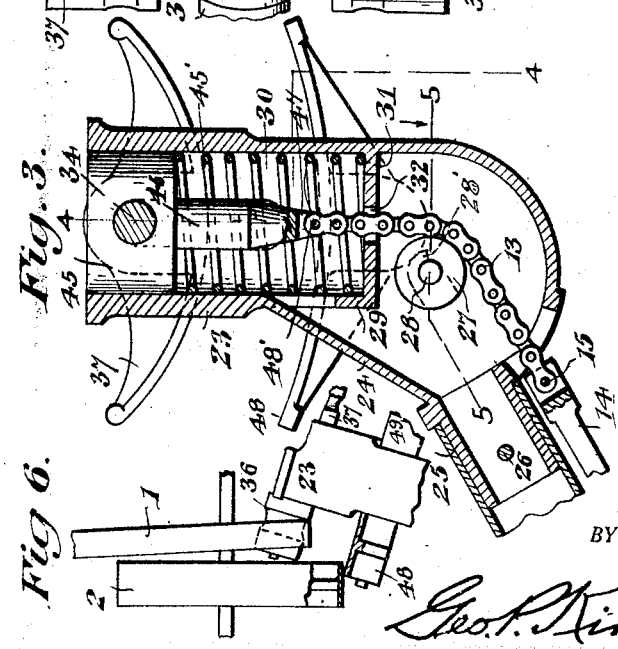
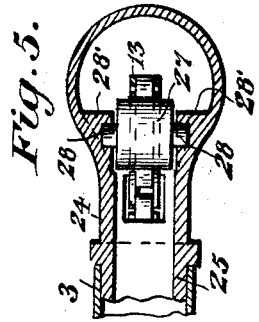
INVENTOR.
*Fred Andrews,*
BY
*Geo. P. Kimmel.* ATTORNEY.

Patented Feb. 9, 1926.

1,572,830

UNITED STATES PATENT OFFICE.

FRED ANDREWS, OF DETROIT, MICHIGAN.

DEVICE FOR PLACING BELTS ON PULLEYS.

Application filed August 29, 1925. Serial No. 53,336.

*To all whom it may concern:*

Be it known that I, FRED ANDREWS, a citizen of the United States, residing at Detroit, in the county of Wayne and State of Michigan, have invented certain new and useful Improvements in Devices for Placing Belts on Pulleys, of which the following is a specification.

This invention relates to a belt placing device, and has for its object to provide, in a manner as hereinafter set forth, a device of the class referred to for expeditiously placing belts on line shaft pulleys.

Further objects of the invention are to provide, in a manner as hereinafter set forth, a device of the class referred to which is simple in its construction and arrangement, strong, durable, compact, thoroughly efficient and convenient in its use, and comparatively inexpensive to manufacture.

With the foregoing and other objects in view the invention consists of the novel construction, combination and arrangement of parts as hereinafter more specifically set forth, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts through the several views:

Figure 1 is a side elevation, broken away, of a belt placing device, in accordance with this invention, and showing the adaptation thereof in connection with the placing of a belt onto a pulley.

Figure 2 is a fragmentary view in sectional plan of the device,

Figure 3 is a fragmentary view in vertical section of the device,

Figure 4 is a section on line 4—4 Figure 3,

Figure 5 is a section on line 5—5 Figure 3,

Figure 6 is a fragmentary view in front elevation showing the adaptation of the device in connection with the placing of the belt on the pulley.

Referring to the drawings in detail a belt and pulley are shown conventionally as at 1, 2 respectively.

A belt placing device, in accordance with this invention, comprises a handle bar 3, of substantial length, provided intermediate its ends with a split coupling band 4, a pair of spaced, depending guides 5, 6, connected together as at 6' and provided with eyes 7 arranged below the handle 3 and arranged forwardly of the band 4, a depending guide 8 positioned between the band 4 and guide 6 and provided with an eye 9 below the handle 3. A hook shaped, manually shiftable, actuating lever 10 depends from the handle 3, and which has its upper portion extended between the split ends of and pivotally connected to the band 4, as at 11. The hook of the lever 10, indicated at 12, is of rearwardly directed curvature and depends from the band 4, as well as projects forwardly thereof. The lever 10 is arranged a substantial distance forwardly of the rear end of the handle 3.

Arranged below the handle 3 and pivotally connected to the free end of the hook 12, of the lever 10, is a flexible, lengthwise adjustable belt clamping jaw operating element comprising a link chain 13 of substantial length, a bar 14 having the rear end of the chain 13 pivotally connected therewith, as at 15, a coupling block 16, having the rear of the bar 14 adjustably connected to the forward end thereof, as at 17, an elongated eye bolt 18, having its forward end adjustably connected to the rear end of the block 16, as at 19, and an elongated link 20 loosely connected at its forward end, to the rear end of the bolt 18, as at 21, and having its rear end pivotally connected, as at 22, to the free end of the hook 12.

The bar 14 extends between the eyes 7 of the guides 5, 6 and the bolt 18 extends through the eye 9 of the guide 8. The block 16 is arranged between the guides 6 and 8.

Arranged forwardly of and extending above the forward end of the handle 3 is a combined support and housing and which comprises an open top, hollow cylindrical body portion 23, offset rearwardly at its bottom, as at 24, and with the said offset portion formed with a rearwardly disposed and downwardly inclined cylindrical extension 25, of a diameter to snugly fit within the forward end of the handle 3, and when so positioned the latter abuts against the rear side of the offset portion 24. The extension 25 is secured to the handle 3, by a holdfast device 26. Positioned within the offset portion 24, is a guide roller 27, provided with a shaft 28 which is mounted in bearings 28', formed on the inner faces of the sides of the body portion 23 near the lower portion thereof. The bottom of the body portion 23 is formed with an opening for the passage of the chain 13 of the jaw operating element into the body portion 23.

Formed integral with the inner face of the body portion 23, is a partition 29, to provide, in connection with the former, a cylindrical chamber 30, of less height than the height of the body portion 23, and having its bottom 31 positioned above the guide roller 27. The bottom 31 centrally thereof has an opening 32 for the passage of the chain 13 into the chamber 30.

The body portion 23 is formed with a pair of diametrically opposed lengthwise extending slots 33 of less length than the height of the chamber 30, and projecting laterally through said slots is a pair of oppositely extending shafts 34, 35 carrying vertically movable clamping jaws 36, 37 of segmental contour. Each of the jaws 36, 37, has its lower or working face formed with an eccentrically disposed lengthwise extending groove 38, and centrally of its top a transversely extending cylindrical chamber 39, closed at its outer end, as at 40. The said outer end, centrally thereof, has opening 41. The inner end of the chamber 40 is closed by a boss 42 formed on a shaft 34 or 35. Arranged within the chamber 39 and interposed between the outer end 40 thereof and the boss 41 is an equalizing coiled spring 43. The shaft 34 or 35, extends through the chamber 39, and also through the opening 41 and has its outer end provided with a cotter pin 44.

Arranged within the chamber 30 is a vertically shiftable spring controlled carrier 45, with which the shafts 34, 35 are connected. The carrier 45 is in the form of a plunger head, snugly fits the wall of the chamber 30, and has depending therefrom, as well formed integral therewith, a rod 46 for the chain 13. The lower end of the rod 46 is bifurcated, as at 47, and pivotally connected therein as at 48, is the forward link of the chain 13. The carrier controlling spring is indicated at 45'.

Supported at each side of the body portion 23, below and in alignment and cooperating with a vertically movable jaw is a stationary jaw. The stationary jaws are indicated at 48, 49 and the top of each of these latter provides a working face which is uninterrupted. The jaws 48 and 49 are carried by shafts 50, 51 respectively, and each has arranged therein an equalizing spring 52. Cotter pins 53 retain the jaws on the shafts 50, 51.

The jaw 48, cooperates with the jaw 36, and the jaw 49 with the jaw 37. When a pair of jaws are cooperating, an upper jaw of the pair moves towards the lower jaw when the jaw operating element is pulled rearwardly. The jaw operating element is common to both upper jaws, and these latter are shifted simultaneously, irrespective when working from either side of the device. The two pair of jaws permit of using the device from the right or left. The lower jaw of a pair clamps underneath and the upper over the belt in a parallel line to the line shaft. The lower jaw is positioned flush against the edge of the pulley, while the upper jaw pushes the belt over onto the pulley on a slight shift of the handle. When the jaw operating element is operated, the upper jaw is moved towards the lower jaw carrying the belt therewith. See the position of the jaws relative to the pulley and belt in Figures 1 and 2.

It is thought that the many advantages of a belt placing device, in accordance with this invention, can be readily understood, but although the preferred embodiment of the device, is as illustrated and described yet it is to be understood that changes in the details of construction can be had will fall within the scope of the invention as claimed.

What I claim is:—

1. A device for the purpose set forth comprising a combined support and housing, a handle bar extended from one end thereof, a stationary lower jaw supported from each side of the housing, a vertically movable normally elevated, spring controlled carrier arranged within said housing, a pair of upper clamping jaws supported from the carrier and arranged at opposite sides of the housing, each upper jaw cooperating with a lower jaw, and means shiftably supported from the handle bar and extending into the housing for shifting the carrier from normal position, to provide for the cooperation of an upper and lower jaw to position a belt on a pulley.

2. A device for the purpose set forth comprising a combined support and housing, a handle bar extended from one end thereof, a stationary lower jaw supported from each side of the housing, a vertically movable normally elevated, spring controlled carrier arranged within said housing, a pair of upper clamping jaws supported from the carrier and arranged at opposite sides of the housing, each upper jaw cooperating with a lower jaw, and means shiftably supported from the handle bar and extending into the housing for shifting the carrier from normal position, to provide for the cooperation of an upper and lower jaw to position a belt on a pulley, and each of the jaws of each pair being segmental in contour.

3. A device for the purpose set forth comprising a slotted housing, a stationary lower jaw carried thereby at one side thereof, a vertically movable, normally elevated, spring controlled carrier arranged within the housing, an upper jaw arranged exteriorly of the housing, in superposed relation to the lower jaw and supported on and bodily movable with the carrier, a handle bar extended from the housing, and means carried by the handle bar and extending into the housing for shifting the carrier from normal to provide for the cooperation of the jaws to position a belt on a pulley.

4. A device for the purpose set forth comprising a slotted housing, a stationary lower jaw carried thereby at one side thereof, a vertically movable, normally elevated, spring controlled carrier arranged within the housing, an upper jaw arranged exteriorly of the housing, in superposed relation to the lower jaw and supported on and bodily movable with the carrier, a handle bar extended from the housing, and means carried by the handle bar and extending into the housing for shifting the carrier from normal to provide for the cooperation of the jaws to position a belt on a pulley, and an equalizing spring in each of said jaws.

5. A belt placing device comprising a stationary and a vertically movable belt clamping jaw, supporting means for the former, a vertically movable, spring controlled, normally elevated supporting and shifting element for said movable jaw, said element arranged within said means, a handle bar extended from said means, and an actuating means for said element carried by said handle bar, extended into said supporting means and connected to said element for shifting the latter from normal to provide for the cooperation of the jaws to position a belt with respect to a pulley, said jaws being of segmental contour.

In testimony whereof, I affix my signature hereto.

FRED ANDREWS.